US010467127B2

(12) United States Patent
Teitelbaum

(10) Patent No.: US 10,467,127 B2
(45) Date of Patent: Nov. 5, 2019

(54) UNIFIED UI/UX AND API TESTING OF WEB APPLICATIONS

(71) Applicant: LendingClub Corporation, San Francisco, CA (US)

(72) Inventor: Joshua Teitelbaum, San Francisco, CA (US)

(73) Assignee: LendingClub Corporation, San Francisco, CA (US)

( * ) Notice: Subject to any disclaimer, the term of this patent is extended or adjusted under 35 U.S.C. 154(b) by 0 days.

(21) Appl. No.: 15/934,102

(22) Filed: Mar. 23, 2018

(65) Prior Publication Data

US 2019/0294527 A1    Sep. 26, 2019

(51) Int. Cl.
*G06F 11/36* (2006.01)
*H04L 29/06* (2006.01)

(52) U.S. Cl.
CPC ...... *G06F 11/3664* (2013.01); *G06F 11/3688* (2013.01); *H04L 63/083* (2013.01)

(58) Field of Classification Search
None
See application file for complete search history.

(56) References Cited

U.S. PATENT DOCUMENTS

| 6,907,546 B1* | 6/2005 | Haswell | G06F 11/3684 |
| | | | 714/38.11 |
| 7,107,574 B1* | 9/2006 | Nedbal | G06F 9/44505 |
| | | | 717/120 |
| 9,021,443 B1* | 4/2015 | Lachwani | G06F 11/3688 |
| | | | 717/124 |
| 9,507,700 B1* | 11/2016 | Vignet | G06F 11/3688 |
| 2012/0174075 A1* | 7/2012 | Carteri | G06F 11/3688 |
| | | | 717/127 |
| 2012/0204091 A1* | 8/2012 | Sullivan | G06F 11/3664 |
| | | | 715/234 |
| 2015/0161088 A1* | 6/2015 | Kamada | G06F 17/2247 |
| | | | 715/235 |

(Continued)

OTHER PUBLICATIONS

Sukoyan, "API monitoring: JMeter for posting data with random generated key", Feb. 2018, Publsihed by Monitis, at https://www.monitis.com/blog/api-monitoring-jmeter-posting-data-random-generated-key/ (Year: 2018).*

*Primary Examiner* — Hossain M Morshed
(74) *Attorney, Agent, or Firm* — Hickman Palermo Becker Bingham LLP

(57) ABSTRACT

Embodiments utilize a unified testing framework (UTF) to automate browser-based API testing of web applications. Embodiments cause a browser to generate an authentication context for a user of the web application, and then test API functionality based on the established authentication context. The UTF is configured to run both UI testing and API testing. Furthermore, in order to facilitate running multiple API tests in a given testing session (potentially being performed in parallel), the UTF stores results of a given API test in a corresponding data island DOM node. Each data island node, generated for each respective API test being run in a given testing session, is identified by a unique global unique identifier (GUID) that is associated with the corresponding API test. Using this GUID, the UTF accesses the test results of each API test individually as the test results are asynchronously returned by the remote service being tested.

32 Claims, 4 Drawing Sheets

(56) References Cited

U.S. PATENT DOCUMENTS

| | | | |
|---|---|---|---|
| 2016/0026730 A1* | 1/2016 | Hasan | G06F 16/986 715/234 |
| 2018/0060216 A1* | 3/2018 | Kasi | G06F 11/3684 |

* cited by examiner

202 — A UNIFIED TESTING FRAMEWORK AUTOMATICALLY CAUSING PERFORMANCE OF ONE OR MORE AUTHENTICATION ACTIONS, AT A CLIENT OF A WEB-BASED SERVICE, TO AUTHENTICATE THE UNIFIED TESTING FRAMEWORK WITH THE WEB-BASED SERVICE, WHERE PERFORMING THE ONE OR MORE AUTHENTICATION ACTIONS RESULTS IN THE CLIENT MAINTAINING AN AUTHENTICATION CONTEXT FOR THE WEB-BASED SERVICE FOR THE UNIFIED TESTING FRAMEWORK

204 — THE UNIFIED TESTING FRAMEWORK AUTOMATICALLY CAUSING THE CLIENT OF THE WEB-BASED SERVICE TO SEND AN API REQUEST, FOR AN API TEST, TO A SERVER-SIDE MODULE OF THE WEB-BASED SERVICE

206 — THE UNIFIED TESTING FRAMEWORK AUTOMATICALLY CAUSING THE API REQUEST TO BE AUTHENTICATED BASED ON INFORMATION FROM THE AUTHENTICATION CONTEXT

208 — THE UNIFIED TESTING FRAMEWORK AUTOMATICALLY CAUSING A RECORD OF RESULTS OF THE API TEST TO BE STORED IN CONNECTION WITH THE CLIENT OF THE WEB-BASED SERVICE

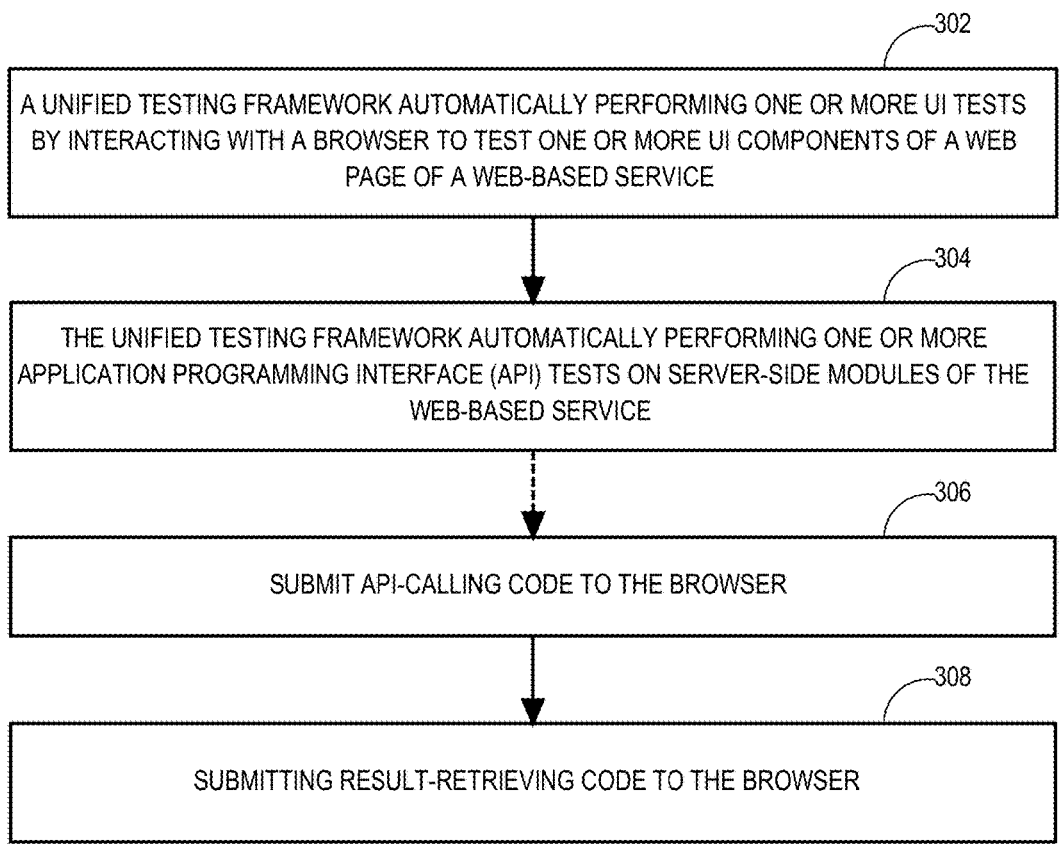

UNIFIED UI/UX AND API TESTING OF WEB APPLICATIONS

FIELD OF THE INVENTION

The present invention relates to enhanced application programming interface (API) testing and, more specifically, to testing user interface and user experience aspects of a web application, and API aspects of the web application, with a single unified testing framework.

BACKGROUND

There are many aspects to web application development, each of which is a potential point of failure for the web application, including:
 user interface (UI);
 user experience (UX);
 interactions between the client and remote services of the web application; and
 functionality of the remote services.

Generally, interactions between a client and a remote service are accomplished via an API that the remote service exposes to allow communication regarding service requests. Testing the functionality of all aspects of a web application is vital to ensuring that the web application operates according to specification.

To test UI/UX aspects of a given web application, web application developers can use focus groups and feedback surveys. Furthermore, to test that the work flow of a web application is to specification as set forth by application development stakeholders, developers can use automated UI/UX testing applications. However, automated UI/UX testing applications do not generally test interactions between a client and a remote service of a web application, or the functionality of a remote service.

Given that user-facing clients (e.g., those run via a browser) are considered highly hostile, testing the interactions between a client and a remote service, and also testing remote service functionality, is very important for the health of a web application. However, such testing, referred to herein as API testing, can also be complex depending on functionality of the remote service. For example, when authentication is required as part of API testing, details of how to initialize and maintain authentication credentials must be maintained and properly utilized during the API testing.

Web developers generally perform API testing by utilizing a non-browser based automation framework suite, or by using JAVA, or JavaScript toolchains outside the context of any browser automation or other UI/UX testing framework. Such API test suites are generally distinct from UI/UX testing applications, and when being used to test a web application, must be set up and run separately from any automated UI/UX testing applications being used to test the web application, which increases the workload of web application developers during the testing phase.

Also, because API test suites are set up outside of the context of a browser, testing a browser-based web application requires that the API test suite be specifically configured to simulate the context (e.g., libraries, authentication context, etc.) that would be available when the web application is run in a browser. Such simulated contexts can contain specially-crafted code paths configured to test a given web application, which are subject to error since the application developers may simplify certain issues that would arise when the web application is run from within a generally-available browser, resulting in buggy web application releases. Because different browsers function differently, API testing outside of the context of generally-available browsers does not uncover browser-specific issues in the web application.

As such, it would be beneficial to simplify and improve web application testing so that the same testing framework accomplishes both API testing and UI/UX testing of a given web application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for a unified testing framework performing API tests under a user authentication context established by the unified testing framework within a browser;

FIG. 3 depicts a flowchart for automatically performing both UI/UX testing and API testing of a given web application using a single unified testing framework and storing results of an API test in a data island DOM node.

DETAILED DESCRIPTION

Figure 1:
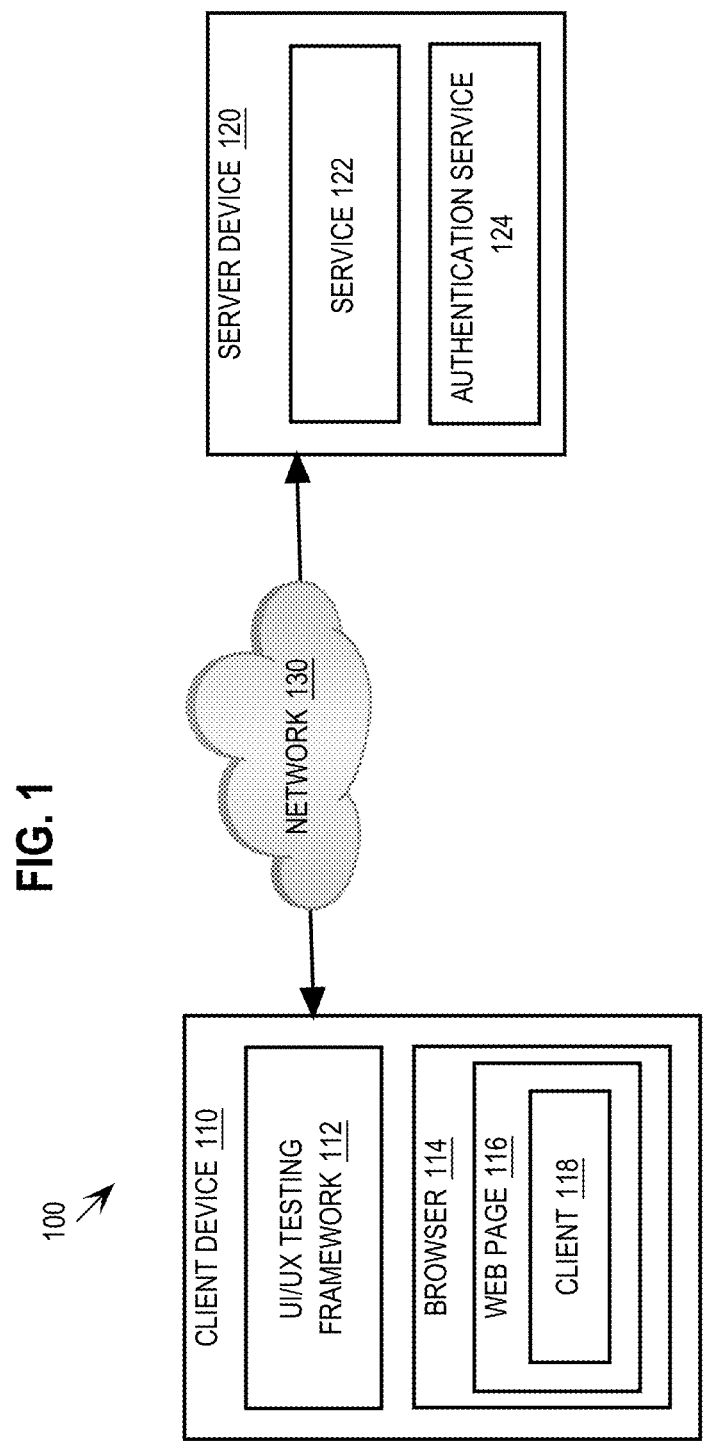
FIG. 1 depicts an example network arrangement on which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments utilize a unified testing framework (UTF) to automate browser-based API testing of web applications. Because the UTF automates generally-available browsers, it is capable of testing both UI/UX and API functionality of the web application. Furthermore, testing API functionality from within a generally-available browser ensures that running the web application in both production and development environments produces the same results.

Embodiments utilize this dual capability to run API tests within an authentication context set up within a browser. Specifically, embodiments first cause a browser to generate an authentication context for a given user of the web application, and then test API functionality based on the established authentication context. Thus, embodiments improve the accuracy of API test results because the API testing is based on an actual browser authentication context. Also, use of the UTF to test both UI/UX and API functionality of a web application conserves resources of the computing device because a single tool requires less computing resources than multiple tools used to test the various aspects of the web application would require.

Furthermore, in order to facilitate running multiple API tests in a given testing session (potentially being performed in parallel), the UTF stores results of a given API test in a node that the UTF creates in the DOM generated by the browser. Nodes that are created in the DOM by the UTF to store test results are referred to herein as "data island nodes". Each data island node, generated for each respective API test being run in a given testing session, is identified by a global unique identifier (GUID) that is associated with the corresponding API test. Using this GUID, the UTF accesses the test results of each API test individually as the test results are asynchronously returned by the remote service being tested. Because multiple API tests may be run in the same user session, and may even be run in parallel, embodiments conserve computing resources by allowing a single invocation of the UTF to perform multiple API tests.

Environment for Browser Automation-Based Testing

Techniques are described herein for using a unified testing framework (UTF) to test the functionality of a web application (also referred to herein as a "web-based service"). According to embodiments, the UTF employs a browser-automation agent to communicate with and automate browsers in order to test web applications. A browser-automation agent (such as Selenium, Kantu, etc.) directly automates one or more generally-available browsers (such as Chrome, Firefox, Safari, or Internet Explorer). A browser is an application which, when run on a computing device, interprets and renders web pages, allows users to interact with web pages, hosts clients of web applications, communicates with server-side modules of such web applications, etc.

FIG. 1 depicts a network arrangement 100 on which embodiments may be implemented. A client device 110 runs a unified testing framework (UTF) 112, which utilizes a browser-automation agent to automate a browser 114 running on the same device. Browser 114 may be any type of browser. While in the example of network arrangement 100 UTF 112 is depicted on a client device, a UTF may reside on one or more server devices communicatively connected to a network to which a user (either human or application) has access, and may automate any browser on any device communicatively connected to the network.

Network arrangement 100 further includes a remote service 122 residing on a server device 120. Service 122 is an example of a remote server-side module of a web application, and may serve any number of clients of the web application running on any number of client devices. Furthermore, in order to handle any requests by client, service 122 may invoke other services not depicted in FIG. 1. In the example of network arrangement 100, browser 114 has rendered a web page 116 that operates as a client 118 of the web application.

Client 118 is configured to communicate with service 122 via API requests. For the purpose of explanation, it shall be assumed that web page 116 is part of a web site for a bank or lender. The web application comprising client 118 and service 122 is a direct pay application that allows a user to directly pay creditors from a loan granted to the user. A user may submit information for a creditor and an amount of money to be remitted to the creditor into a UI of client 118. In response to receiving this information, e.g., after the user clicks a "submit" button, client 118 generates an API request, using the API exposed by service 122, with the submitted information. Service 122 processes the API request, based on the information included in the request, and returns a response to client 118.

API Testing Under an Established Authentication Context

When the client of a web application is user-facing, users sometimes input unexpected values into the client, or even attempt to hack the web application in order to adjust its functionality. In order to ensure that communications between client 118 and service 122 function properly, and also to ensure that service 122 itself functions according to specification and is resilient to error and attack, an application developer performs API testing via UTF 112.

According to embodiments, UTF 112 automates browser 114 to establish an authentication context and then causes the API testing to be performed under the established authentication context within the browser. In this way, UTF 112 performs the API tests under similar circumstances as would be applied when the web application is deployed to production, i.e., in production environments generated within generally-available browsers. FIG. 2 depicts a flowchart 200 for a UTF performing API tests under a user authentication context established by the UTF within a browser.

At step 202 of flowchart 200, a unified testing framework automatically causes performance of one or more authentication actions, at a client of a web-based service, to authenticate the unified testing framework with the web-based service, where performing the one or more authentication actions results in the client maintaining an authentication context for the web-based service for the unified testing framework. For example, UTF 112 sends instructions to browser 114 to submit authentication information via UI for client 118 in web page 116.

The authentication information may be, for example, a username and password for a test user account utilized by UTF 112. Browser 114 executes the instructions from UTF 112, which causes the browser to populate a username and a password field, in an authentication dialog on web page 116, with the test user account information. Execution of the instructions further causes browser 114 to subsequently click a submit button on web page 116. The authentication actions in this example are exemplary, and the authentication actions of step 202 may comprise a different set of actions that cause a browser to generate an authentication context.

When browser 114 submits the authentication information to client 118 as instructed by UTF 112, client 118 sends the authentication information for a test user account to service 122. Service 122 sends the authentication information to an authentication service 124. Authentication service 124 determines whether the authentication information is valid. Assuming that the authentication information is valid, authentication service 124 creates a session token, stores data indicating that the session token is valid until a certain expiration time, and sends the session token to service 122. Service 122 then sets a cookie, containing the session token, on client device 110.

Until the user is logged out, or the client session is closed in another way (i.e., by web page 116 being closed, client 118 crashing, etc.), client 118 maintains an authentication context for the test user account for service 122. Specifically, all actions performed by client 118, including API requests, are performed in the established authentication context until the current client session closes, which terminates the established authentication context.

As part of maintaining the current authentication context for the test user account, while the user remains logged in, browser 114 sends the session token for the test user account with API requests to any service invoked by client 118. Also, when service 122 invokes any other service, e.g., via a further API request, service 122 provides the session token to the other service to allow the other service to authenticate the session token with authentication service 124.

Inclusion of the session token with an API request allows the receiving service to determine that the API request is being performed by an authenticated user under the user's authentication context. Specifically, in response to an API request, a service, such as service 122, checks with authentication service 124 to determine whether the session token received with the API request is valid. If the session token is a valid session token (that has not expired), authentication service 124 confirms that session token is valid. The service only performs the requested action upon confirming that the received session token is valid with authentication service 124.

Steps 204 and 206 of flowchart 200 comprise steps performed by the unified testing framework to perform an API test on the web-based service. According to an embodiment, the steps are performed while the client maintains the authentication context for the web-based service for the unified testing framework. To illustrate in the context of the above example, steps 204 and 206 are performed while the test user account remains logged in at client 118, during which time, browser 114 maintains the authentication context for service 122 for the test user account.

At step 204, the unified testing framework causes the client of the web-based service to send an API request to a server-side module of the web-based service. For example, UTF 112 causes browser 114 to execute instructions that causes client 118 to send an API request to service 122.

To illustrate, client 118 and service 122 implement a direct pay application that allows a user to directly pay creditors of a loan previously granted to the user. In order to perform an API test on the direct pay application, while browser 114 maintains an authentication context for the test user account, UTF 112 causes browser 114 to populate a direct pay UI for client 118 with the identity of a creditor and an amount to directly pay to the creditor. UTF 112 further instructs browser 114 to submit the direct pay information to service 122. Upon receiving the instruction to submit, browser 114 causes client 118 to generate an API request, using an API exposed by service 122, that includes: the value entered into web page 116 for the identity of the creditor, the value entered into web page 116 for the amount to directly pay to the creditor, and the session token for the current authentication context.

At step 206, the unified testing framework causes the API request to be authenticated based on information from the authentication context. For example, because the API request is performed while browser 114 maintains the authentication context for the test user account for service 122, the API request includes the session token received when the test user account was authenticated with authentication service 124. When service 122 receives the API request with the session token, service 122 sends the session token to authentication service 124, which authenticates the session token as valid. In response to receiving confirmation that the session token is valid, which means that the API request is being performed in the context of the test user account, service 122 performs the task requested by the API request based on the settings and permissions granted to the test user account, and responds to the API request accordingly.

At step 208, the unified testing framework automatically causes a record of results of the API test to be stored in connection with the client of the web-based service. For example, when service 122 receives the API request detailed in connection with step 204 above, service 122 authenticates the API request with authentication service 124, and then processes the API request according to the values included in the API request. The values in the API request comprise a test of the functionality of service 122, which may test an expected communication path, an erroneous communication path, or a malicious communication path.

To test an expected communication path, UTF 112 causes browser 114 to input values that conform to the specifications of the web application. Specifically, the value input for the identity of the creditor identifies a creditor, and the value input for the payment amount is a number, as expected. When service 122 receives such an API request, service 122 determines whether the test user account identified by the received token has permission to request that an amount of a loan be remitted to a creditor. In response to determining that the test user account has such permission, service 122 attempts to process the API request according to the web application specifications.

To test an erroneous communication path, UTF 112 may cause browser 114 to input values that do not conform to the value format requirements of a UI field. For example, UTF 112 performs an API test that inputs a string to a number-type field, or that inputs an unexpected character. Further, UTF 112 may cause browser 114 to input values that violate logical rules on the input values required by the web application specification. For example, UTF 112 performs an API test that inputs personal information that does not match corresponding personal information in the test user account, that inputs a remittance value that is larger than the balance available to the user, or that inputs a remittance value that is smaller than a minimum required remittance value.

UTF 112 may also perform API tests that determine whether the web application can withstand malicious attacks. For example, UTF 112 performs an API test that inputs, into an input field of client 118, JavaScript or other coding-type language that is meant to hack the web application, that inputs a string of characters into an input field that is extraordinarily long, that attempts to perform steps of the service being performed by the web application out of the order prescribed by the specification of the service, etc.

Returning to the discussion of step 208 of flowchart 200, service 122 asynchronously responds to the API request based on the information in the API request, e.g., with a message that indicates whether the direct pay operation was successfully performed. UTF 112 causes browser 114 to store results of the API request, whenever they are asynchronously received from service 122, in a data island node on the DOM of web page 116, as described in further detail below.

Because the API testing is performed under the same authentication context as an actual user login would provide in practice, as well as having access to the same libraries, the API testing returns more accurate results. Also, since the tool causes the client to generate an authentication context for the UTF, testing the API functionality does not require imitation of an authentication context solely for the purpose of the API testing.

Unified Testing Framework Performing Both Ui/Ux and Api Testing

FIG. 3 depicts a flowchart 300 for automatically performing both UI/UX testing and API testing of a given web application using a single unified testing framework and storing results of an API test in a data island DOM node. According to one or more embodiments, UTF 112 submits a single script that causes browser 114 to perform both one or more UI tests and one or more API tests. Using a single script to perform both types of testing facilitates using the UI elements of client 118 to authenticate with the web application and then using the resulting authentication context for the API tests. Furthermore, in the context of a unified tool, such a single script reduces the number of times that web page 116 must be traversed to perform both kinds of tests and reduces the number of invocations of UTF 112 required to test the web application.

Also, because UI/UX testing and API testing of a given web application is performed by the same unified tool, running these tests in parallel using the unified tool reduces the load on the computing device. Specifically, resources need only be allocated for a single invocation of the UTF to perform both types of testing, in contrast with the significantly-increased resources that would be required to run separate tools for UI/UX testing and API testing, respectively.

At step 302 of flowchart 300, a unified testing framework automatically performs one or more UI tests by interacting with a browser to test one or more UI components of a web page of a web-based service. To illustrate, UTF 112 causes browser 114 to navigate to web page 116 and then to perform a set of actions that test one or more components of the user interface presented in web page 116. According to an embodiment, UTF 112 causes browser 114 to submit certain authentication information, via web page 116, for service 122 to authentication with authentication service 124.

At step 304, the unified testing framework automatically performs one or more API tests on server-side modules of the web-based service. For example, UTF 112 performs one or more API tests on service 122. The API tests may be of any kind, as described in further detail above. For purposes of this example, UTF 112 performs a single API test with an API request to remit a certain amount to a particular creditor, where the API request at least identifies a creditor, and indicates a remittance amount. According to further embodiments, UTF 112 cause browser 114 to perform multiple API tests during a single invocation of UTF 112.

According to an embodiment, UTF 112 runs at least some of the API tests in parallel. For example, UTF 112 runs multiple API tests in parallel by causing browser 114 to send out a first API request and then send out a second API request before a response to the first API request has been recorded. As another example, UTF 112 runs multiple API tests in parallel by causing browser 114 to send out a first API request and then send out a second API request before a response to the first API request has been received or even before service 122 finishes processing the first API request.

According to one or more embodiments, each particular API test of the one or more API tests of step 304 is performed, at least in part, by performing steps 306 and 308 of flowchart 300.

API-Calling Code

At step 306, API-calling code is submitted to the browser, where execution of the API-calling code causes:

adding a node, which corresponds to a unique identifier that identifies the particular API test, to a document object model (DOM) representing the web page;
initiating a call, through an API, to a server-side module of the web-based service; and
storing information, associated with the call, in the node that corresponds to the unique identifier.

For example, UTF 112 causes browser 114 to execute particular API-calling code that is configured to cause client 118 to generate an API request for service 122 as described above. Upon execution of the API-calling code, browser 114 causes client 118 to formulate, and send to service 122, an API request for remitting money to a particular creditor, where the API request at least identifies the creditor, and indicates a remittance amount.

Data Island Nodes

Execution of the API-calling code also causes browser 114 to create a data island node, in the DOM of web page 116, in which to store results of the API test. According to one or more embodiments, a data island node is dynamically created by the browser as instructed by UTF 112, and is not originally encoded in the source encoding of web page 116. A given data island node is associated specifically with a particular API test, and is identified with a global unique identifier (GUID) that UTF 112 assigns to the associated API test.

Results of an API test can be difficult to retrieve, especially when the UTF runs multiple API tests in parallel, because the interactions between UTF 112, client 118, and service 122 are generally asynchronous. Embodiments make the API test results for a given API test available for retrieval by storing the results in a data island node associated with the API test. In this way, a data island node is a unique repository for the results of each API test being performed by UTF 112. Furthermore, storing the results of each API test in an associated data island node facilitates running API tests in parallel because the API test results are maintained in a dedicated data island node.

According to an embodiment, a data island node is implemented as an invisible <div> node in the DOM of web page 116 within the authenticated page context, where the <div> node has an identifier attribute (the value of which is the GUID of the API test associated with the data island), an error status attribute, and a test data attribute. The following is an example of a <div> node prior to being populated with results from the associated API test: <DIV guid='7829374892347' state='pending' dataValue=''/>

Dynamic Generation of the Api-Calling Code

According to one or more embodiments, UTF 112 submits the API-calling code to browser 114 by submitting a template for the API-calling code to browser 114 and causing browser 114 to dynamically generate the API-calling code based on the template. Specifically, before performing a particular API test, UTF 112 does not have the GUID that browser 114 will assign to the particular API test. However, because one or more tasks of the API-calling code require knowledge of the GUID, the API-calling code must include the dynamically-generated GUID. Thus, to produce the dynamically-generated API-calling code, UTF 112 causes the browser to generate the GUID for a given API test and then causes browser 114 to insert the GUID into the template for the API-calling calling code.

According to one or more embodiments, browser 114 then executes the dynamically-generated API-calling code, which causes an AJAX request, with information for the API request, to be sent to service 122. The following is an example AJAX request for service 122 that includes an API request to remit $30,000 to "Lender A": doAjax.post ('http://path/to/api/payCreditor', {'remittance:30000; creditor: "Lender A"'});

Populating a Data Island Node

Execution of the API-calling code further causes browser 114 to detect when the API request has been returned by service 122, and, in response to detecting that the API request has been returned, to write results to the associated data island. For example, service 122 is able to perform the requested service without issues, and returns a communication indicating the success of the request. Based on the API-calling code, browser 114 sets up a listener attached to the AJAX request that detects the communication from service 122.

In response to detecting the communication and based on the API-calling code, browser 114 finds the data island node for the corresponding API test by the assigned GUID, and writes a success value (such as "success", "completed", "ready", etc.) to the error status attribute of the node, and also writes a JSON stringified version of the communication from service 122 to the test data attribute of the data island node. In this way, browser 114 stores the results of the API test in the corresponding data island node for later retrieval. The following is an example of a data island that has been populated with the results of the corresponding API test:
<DIV guid='7829374892347' state='completed' dataValue='{accountId: 10017367, accountBalance: "1000.54"}'>

According to one or more embodiments, browser 114 writes an error value (such as "error", "incomplete", etc.) to the error status attribute of a data island node upon detecting that there was an error in API communication or in processing an API request. According to an embodiment, browser 114 does not store any value in the test data attribute of a data island node when an associated API test results in an error.

For example, browser 114 writes an error value to the error status attribute of a given data island node when a response to an associated API request has not been returned after a pre-determined amount of time. As a further example, browser 114 writes an error value to the error status attribute of a given data island node upon receiving a communication from service 122 indicating that the API request for the API test corresponding to the data island node generated an error within service 122. Such an error may be generated when service 122 detects that the API request includes erroneous or malicious data.

To illustrate, a given API request includes a session token for the test user account and comprises a request to work with money from a bank account that is not associated with the test user account. In response to receiving this API request, service 122 determines that the account indicated in the API request is not associated with the user account associated with the session token in the API request. In response, service 122 ceases processing the requested service and sends the following communication to client 118: "ERROR: unauthorized bank access request". According to the API-calling code, browser 114 detects the word "error" within the communication and, in response, populates the error status attribute of the data island node associated with the API test with an error value.

As such, when a given API test is complete (either resulting in success or some other result), the error status attribute of the data island associated with the given API test is changed to a value that reflects the result of the test. Each API test being performed by UTF 112 is associated with a distinct data island, which allows the results of a given API test to be retrieved as soon as the results of the API test are ready to be read and without having to wait for results from any other API test. Alternatively, the results of an API test can be stored in the data island node indefinitely.

Retrieval of API Test Results

Continuing with the discussion of flowchart 300, at step 308, result-retrieving code is submitted to the browser. For example, UTF 112 causes browser 114 to execute particular result-retrieving code for a given API test that waits for the error status of the data island node associated with the given API test to change, e.g. from null to a non-null value, or from "pending" to a different value, etc. In order to wait for the error status of the particular data island node to change, the result-retrieving code causes browser 114 to assign a listener application to listen for a change in the error status attribute.

Based on the result-retrieving code, when the listener application detects that the error status has changed, browser 114 retrieves the results of the given API test from the associated data island node. To illustrate, upon determining that the error status of the data island node has changed, which indicates that service 122 has returned a result from the associated API request that has been written to the data island node, browser 114 retrieves the test data attribute of the data island node.

According to an embodiment, the results of a data island are retrieved while browser 114 maintains the authentication context established for UTF 112, described above, which requires that browser 114 not terminate the user session at least until after the results of the API test are retrieved from the data island node.

The information retrieved from the node that corresponds to the unique identifier of a given API test enables a determination of whether the server-side module satisfies the given API test. As described above, when an API test completes (rather than timing out or otherwise failing) the test data attribute of the associated data island node is populated with a stringified version of the communication from service 122. If the API test does time out, or is not completed for another reason, the test data attribute of the associated data island node maintains the default value, which is indicative of an issue with the server-side module.

According to one or more embodiments, UTF 112 causes browser 114 to perform one of the following in response to retrieving a test data attribute: display the results in a web page; store the results for later review; or automatically parse the results to determine whether service 122 satisfied the API test.

According to an embodiment, UTF 112 causes browser 114 to automatically parse results of a given API test. For example, UTF 112 automates browser 114 to test one or more assertions about the data in a given data island node. An assertion is a pre-defined test that browser 114 runs over the retrieved data. An example positive assertion is "the returned account balance is 100.23", which UTF 112 instructs browser 114 to test by parsing an account balance value from the value of the test data attribute and testing the account balance value to determine whether it is equal to 100.23. An example negative assertion is "the service should not access account A when the account is not associated with the authenticated user", which UTF 112 instructs browser 114 to test by determining whether the error status of the data island node associated with the API test is an error value. Browser 114 displays assertion results in browser 114 and/or stores the assertion results for later review.

Dynamic Generation of the Result-Retrieving Code

According to one or more embodiments, UTF 112 submits the result-retrieving code to browser 114 by submitting a template for the result-retrieving code to browser 114 and causing browser 114 to dynamically generate the result-retrieving code based on the template. As explained above, before performing a particular API test, UTF 112 does not have the GUID that browser 114 will assign to the particular API test. However, because one or more tasks of the result-retrieving code requires knowledge of the GUID, the result-retrieving code must include the dynamically-generated GUID. Thus, to produce the dynamically-generated result-retrieving code, UTF 112 causes browser 114 to insert the GUID into the template for the result-retrieving calling code. Browser 114 executes the dynamically-generated result-retrieving code, as described in detail above.

Because the response to the API request, from service 122, is asynchronous, the closure of the API-calling code resolves asynchronously, and may occur prior to execution of the result-retrieving code. Thus, the result-retrieving code is able to handle when the data island node for a particular API test does not yet exist.

System Architecture

FIG. 1 is a block diagram that depicts an example network arrangement 100, according to embodiments. Network arrangement 100 includes a client device 110 and a server device 120 communicatively coupled via a network 130. Example network arrangement 100 may include other devices, including client devices, server devices, and display devices, according to embodiments.

Client device 110 may be implemented by any type of computing device that is communicatively connected to network 130. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with UTF 112 and a browser 114. UTF 112 may be implemented in any number of ways, including as a stand-alone application running on client device 110, or as a plugin to browser 114, etc. Client device 110 may be configured with other mechanisms, processes and functionalities, depending upon a particular implementation.

Network 130 may be implemented with any type of medium and/or mechanism that facilitates the exchange of information between client device 110 and server device 120. Furthermore, network 130 may facilitate use of any type of communications protocol, and may be secured or unsecured, depending upon the requirements of a particular embodiment.

Server device 120 may be implemented by any type of computing device that is capable of communicating with client device 110 over network 130. In network arrangement 100, server device 120 is configured with service 122. Server device 120 may be configured with other mechanisms, processes and functionalities, depending upon a particular implementation.

An application runs on one or more computing devices and comprises a combination of software and allocation of resources from the one or more computing devices. Specifically, an application is a combination of integrated software components and an allocation of computational resources, such as memory, and/or processes on the computing device for executing the integrated software components on a processor, the combination of the software and computational resources being dedicated to performing the stated functions of the application.

In an embodiment, each of the processes described in connection with UTF 112, browser 114, and/or service 122 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer. Furthermore, any portion of the processes described in connection with a particular entity may be performed by another entity, according to embodiments.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
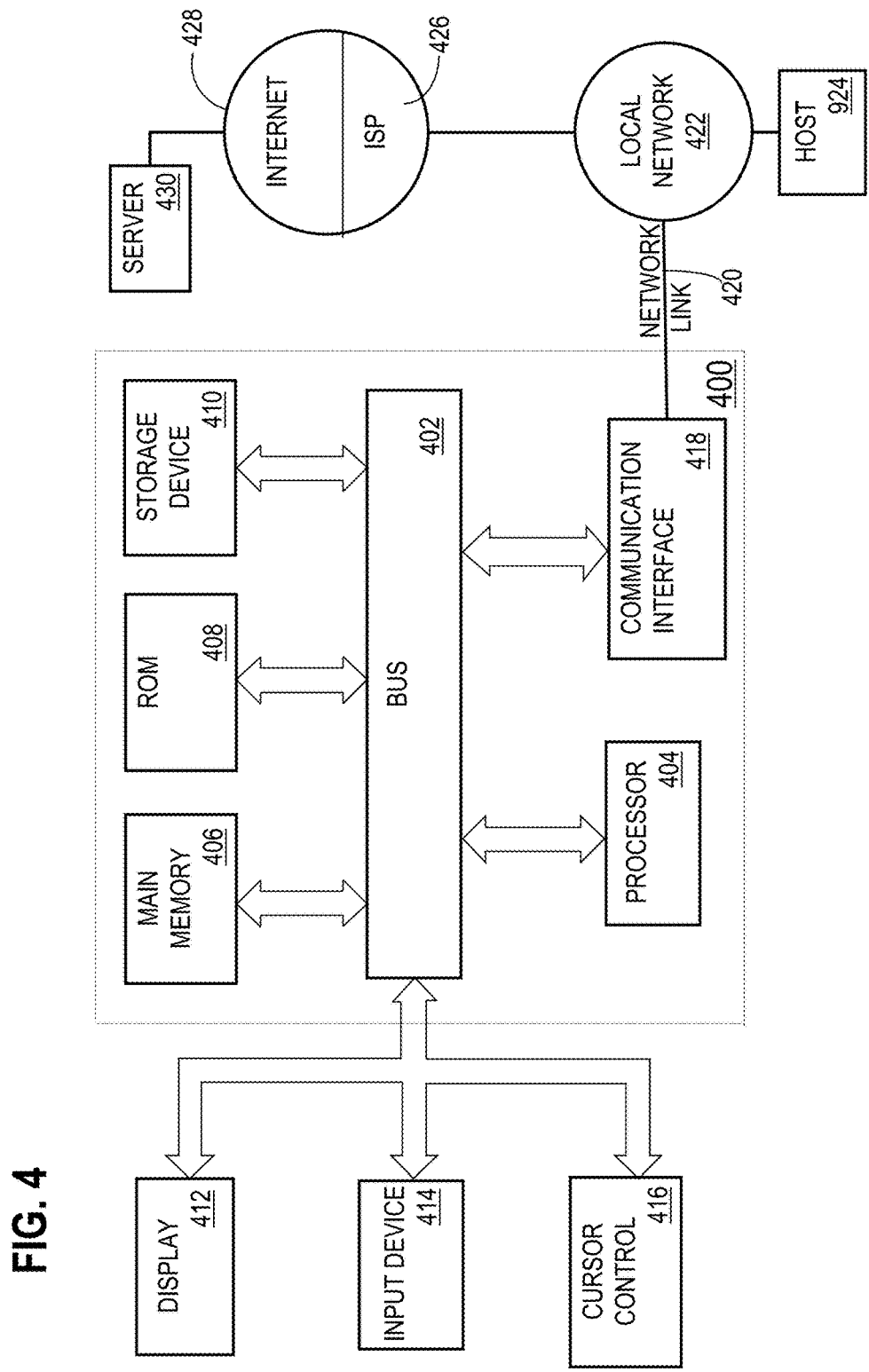
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method for generating programming interface (API) test results using a unified testing framework, the method comprising:
   the unified testing framework automatically causing performance of one or more authentication actions, at a client of a web-based service, to authenticate the unified testing framework with the web-based service;
   wherein performing the one or more authentication actions results in the client maintaining an authentication context for the web-based service for the unified testing framework;
   while the client maintains the authentication context for the web-based service for the unified testing framework:

the unified testing framework automatically performing one or more API tests by:
    causing the client of the web-based service to send one or more API requests to a server-side module of the web-based service; and
    causing the one or more API requests to be authenticated based on information from the authentication context;
the unified testing framework automatically causing one or more records of results of the one or more API tests to be stored in one or more data island nodes of a document object model (DOM) of a web page;
wherein the method is performed by one or more computing devices.

2. The computer-executed method of claim 1, wherein:
a browser maintains the DOM of the web page within memory of a computing device;
causing the one or more records of results of the one or more API tests to be stored in the one or more data island nodes of the DOM of the web page comprises:
    causing the browser to add a particular data island node, of the one or more data island nodes, to the DOM of the web page,
    wherein the particular data island node corresponds to a particular API test of the one or more API tests, and
    storing the results of the particular API test within an attribute of the particular data island node.

3. The computer-executed method of claim 1, further comprising:
retrieving the one or more records of results of the one or more API tests; and
making the results of the one or more API tests available for review by
    performing one or more of:
    displaying the results,
    storing the results, or
    automatically parsing the results.

4. The computer-executed method of claim 1, wherein the unified testing framework automatically causing performance of the one or more authentication actions at the client of the web-based service comprises the unified testing framework causing a browser to automatically input a username and password to an authentication dialog of the client.

5. The computer-executed method of claim 1, wherein:
after the unified testing framework automatically causing performance of the one or more authentication actions, the client receives a session token;
at least one of the one or more API requests to the server-side module of the web-based service includes the session token; and
the information from the authentication context comprises the session token.

6. The computer-executed method of claim 1, wherein the client is hosted within the web page.

7. The computer-executed method of claim 1, wherein:
the one or more API requests includes a particular API request that corresponds to a particular API test of the one or more API tests;
causing the client of the web-based service to send the one or more API requests to the server-side module of the web-based service comprises causing the client of the web-based service to send the particular API request to the server-side module of the web-based service by:
    submitting API-calling code to a browser interpreting the web page;
    wherein the API-calling code, when executed by the browser, causes:
        addition of a particular data island node, of the one or more data island nodes, to the DOM,
        wherein the particular data island node corresponds to a unique identifier that identifies the particular API test, and
        initiation of a call, through an API, to the server-side module of the web-based service; and
the unified testing framework automatically causing the one or more records of results of the one or more API tests to be stored in the one or more data island nodes of the DOM of the web page further comprises the API-calling code, when executed by the browser, causing storage of particular information, associated with the call, in the particular data island node that corresponds to the unique identifier.

8. The computer-executed method of claim 1, further comprising:
retrieving a particular record of results of a particular API test, of the one or more API tests, from a particular data island node of the one or more data island nodes,
wherein the particular data island node corresponds to the particular API test;
wherein the particular record of results enables a determination of whether the server-side module satisfies the particular API test.

9. The computer-executed method of claim 1, wherein:
the one or more API tests comprises a particular API test;
the one or more data island nodes comprises a particular data island node that corresponds to a unique identifier that identifies the particular API test;
the method further comprises, after the unified testing framework automatically causing the one or more records of results of the one or more API tests to be stored in the one or more data island nodes of the DOM of the web page:
    submitting result-retrieving code to a browser interpreting the web page;
    wherein the result-retrieving code, when executed by the browser, causes a record of results of the particular API test to be retrieved, based on the unique identifier that identifies the particular API test, from the particular data island node that corresponds to the unique identifier.

10. The computer-executed method of claim 9, further comprising automatically performing analysis of the record of results of the particular API test retrieved from the particular data island node that corresponds to the unique identifier to determine whether the server-side module of the web-based service satisfies the particular API test.

11. A computer-executed method for unified testing of User Interface (UI) components and server-side modules of a web-based service, comprising:
a unified testing framework automatically performing one or more UI tests by interacting with a browser to test one or more UI components of a web page of the web-based service; and
the unified testing framework automatically performing one or more application programming interface (API) tests on server-side modules of the web-based service by, for each particular API test of the one or more API tests:
    submitting API-calling code to the browser;
    wherein the API-calling code, when executed by the browser, causes:

addition of a node, which corresponds to a unique identifier that identifies the particular API test, to a document object model (DOM) representing the web page;

initiation of a call, through an API, to a server-side module of the web-based service;

storage of information, associated with the call, in the node that corresponds to the unique identifier;

submitting result-retrieving code to the browser;

wherein the result-retrieving code, when executed by the browser, causes the information associated with the call to be retrieved, based on the unique identifier, from the node that corresponds to the unique identifier; and wherein the information retrieved from the node that corresponds to the unique identifier of a given API test enables a determination of whether the server-side module satisfies the given API test;

wherein the method is performed by one or more computing devices.

12. The computer-executed method of claim 11, further comprising automatically performing analysis of the information retrieved from the node that corresponds to the unique identifier to determine whether the server-side module satisfies the given API test.

13. The computer-executed method of claim 11 further comprising the unified testing framework submitting a particular script to the browser, wherein execution of the particular script by the browser causes automatic performance of both the one or more UI tests and the one or more API tests.

14. The computer-executed method of claim 13 wherein execution of the particular script by the browser further causes dynamic generation of the respective API-calling code for each API test of the one or more API tests.

15. The computer-executed method of claim 11 wherein automatically performing the one or more API tests comprises performing a plurality of API tests in parallel, wherein each API test of the plurality of API tests causes creation of a distinct node in the DOM of the web page.

16. The computer-executed method of claim 11 wherein:
addition of a node comprises addition of a node that has:
an error status attribute, and
a test data attribute; and
execution of the result-retrieving code causes the browser to repeatedly read a status value associated with the error status attribute to determine whether a value of the error status attribute has changed; and
causing the information associated with the call to be retrieved further comprises:
in response to detecting that the value of the error status attribute has changed, retrieving a value of the test data attribute.

17. One or more non-transitory computer-readable media storing instructions that, when executed by one or more processors, cause:
a unified testing framework automatically causing performance of one or more authentication actions, at a client of a web-based service, to authenticate the unified testing framework with the web-based service;
wherein performing the one or more authentication actions results in the client maintaining an authentication context for the web-based service for the unified testing framework;
while the client maintains the authentication context for the web-based service for the unified testing framework:
the unified testing framework automatically performing one or more application programming interface (API) tests by:
causing the client of the web-based service to send one or more API requests to a server-side module of the web-based service; and
causing the one or more API requests to be authenticated based on information from the authentication context;
the unified testing framework automatically causing one or more records of results of the one or more API tests to be stored in one or more data island nodes of a document object model (DOM) of a web page.

18. The one or more non-transitory computer-readable media of claim 17, wherein:
a browser maintains the DOM of the web page within memory of a computing device;
causing the one or more records of results of the one or more API tests to be stored in the one or more data island nodes of the DOM of the web page comprises:
causing the browser to add a particular data island node, of the one or more data island nodes, to the DOM of the web page,
wherein the particular data island node corresponds to a particular API test of the one or more API tests, and
storing the results of the particular API test within an attribute of the particular data island node.

19. The one or more non-transitory computer-readable media of claim 17, wherein the instructions further comprise instructions that, when executed by one or more processors, cause:
retrieving the one or more records of results of the one or more API tests; and
making the results of the one or more API tests available for review by
performing one or more of:
displaying the results,
storing the results, or
automatically parsing the results.

20. The one or more non-transitory computer-readable media of claim 17, wherein the unified testing framework automatically causing performance of the one or more authentication actions at the client of the web-based service comprises the unified testing framework causing a browser to automatically input a username and password to an authentication dialog of the client.

21. The one or more non-transitory computer-readable media of claim 17, wherein:
after the unified testing framework automatically causing performance of the one or more authentication actions, the client receives a session token;
at least one of the one or more API requests to the server-side module of the web-based service includes the session token; and
the information from the authentication context comprises the session token.

22. The one or more non-transitory computer-readable media of claim 17, wherein the client is hosted within the web page.

23. The one or more non-transitory computer-readable media of claim 17, wherein:
the one or more API requests includes a particular API request that corresponds to a particular API test of the one or more API tests;
causing the client of the web-based service to send the one or more API requests to the server-side module of the web-based service comprises causing the client of the web-based service to send the particular API request to the server-side module of the web-based service by:
submitting API-calling code to a browser interpreting the web page;
wherein the API-calling code, when executed by the browser, causes:
addition of a particular data island node, of the one or more data island nodes, to the DOM, wherein the particular data island node corresponds to a unique identifier that identifies the particular API test, and
initiation of a call, through an API, to the server-side module of the web-based service; and
the unified testing framework automatically causing the one or more records of results of the one or more API tests to be stored in the one or more data island nodes of the DOM of the web page further comprises the API-calling code, when executed by the browser, causing storage of particular information, associated with the call, in the particular data island node that corresponds to the unique identifier.

24. The one or more non-transitory computer-readable media of claim 17, further comprising:
retrieving a particular record of results of a particular API test, of the one or more API tests, from a particular data island node of the one or more data island nodes, wherein the particular data island node corresponds to the particular API test;
wherein the particular record of results enables a determination of whether the server-side module satisfies the particular API test.

25. The one or more non-transitory computer-readable media of claim 17, wherein:
the one or more API tests comprises a particular API test;
the one or more data island nodes comprises a particular data island node that corresponds to a unique identifier that identifies the particular API test;
the instructions further comprise instructions that, when executed by one or more processors, cause, after the unified testing framework automatically causing the one or more records of results of the one or more API tests to be stored in the one or more data island nodes of the DOM of the web page:
submitting result-retrieving code to a browser interpreting the web page;
wherein the result-retrieving code, when executed by the browser, causes a record of results of the particular API test to be retrieved, based on the unique identifier that identifies the particular API test, from the particular data island node that corresponds to the unique identifier.

26. The one or more non-transitory computer-readable media of claim 25, wherein the instructions further comprise instructions that, when executed by one or more processors, cause automatically performing analysis of the record of results of the particular API test retrieved from the particular data island node that corresponds to the unique identifier to determine whether the server-side module of the web-based service satisfies the particular API test.

27. One or more non-transitory computer-readable media storing instructions that, when executed by one or more processors, cause performance of unified testing of User Interface (UI) components and server-side modules of a web-based service, comprising:

a unified testing framework automatically performing one or more UI tests by interacting with a browser to test one or more UI components of a web page of the web-based service; and
the unified testing framework automatically performing one or more application programming interface (API) tests on server-side modules of the web-based service by, for each particular API test of the one or more API tests:
submitting API-calling code to the browser;
wherein the API-calling code, when executed by the browser, causes:
addition of a node, which corresponds to a unique identifier that identifies the particular API test, to a document object model (DOM) representing the web page;
initiation of a call, through an API, to a server-side module of the web-based service;
storage of information, associated with the call, in the node that corresponds to the unique identifier;
submitting result-retrieving code to the browser;
wherein the result-retrieving code, when executed by the browser, causes the information associated with the call to be retrieved, based on the unique identifier, from the node that corresponds to the unique identifier; and
wherein the information retrieved from the node that corresponds to the unique identifier of a given API test enables a determination of whether the server-side module satisfies the given API test.

28. The one or more non-transitory computer-readable media of claim 27, wherein the instructions further comprise instructions that, when executed by one or more processors, cause automatically performing analysis of the information retrieved from the node that corresponds to the unique identifier to determine whether the server-side module satisfies the given API test.

29. The one or more non-transitory computer-readable media of claim 27 wherein the instructions further comprise instructions that, when executed by one or more processors, cause the unified testing framework submitting a particular script to the browser, wherein execution of the particular script by the browser causes automatic performance of both the one or more UI tests and the one or more API tests.

30. The one or more non-transitory computer-readable media of claim 29 wherein execution of the particular script by the browser further causes dynamic generation of the respective API-calling code for each API test of the one or more API tests.

31. The one or more non-transitory computer-readable media of claim 27 wherein automatically performing the one or more API tests comprises performing a plurality of API tests in parallel, wherein each API test of the plurality of API tests causes creation of a distinct node in the DOM of the web page.

32. The one or more non-transitory computer-readable media of claim 27 wherein:
addition of a node comprises addition of a node that has:
an error status attribute, and
a test data attribute; and
execution of the result-retrieving code causes the browser to repeatedly read a status value associated with the error status attribute to determine whether a value of the error status attribute has changed; and
causing the information associated with the call to be retrieved further comprises:

in response to detecting that the value of the error status attribute has changed, retrieving a value of the test data attribute.

\* \* \* \* \*